United States Patent [19]
Bruns

[11] Patent Number: 5,455,291
[45] Date of Patent: Oct. 3, 1995

[54] COAL-TAR-PITCH-BASED COMPOSITIONS

[75] Inventor: Joseph R. Bruns, Bridge City, Tex.

[73] Assignee: U.S. Intec, Inc., Port Arthur, Tex.

[21] Appl. No.: 195,621

[22] Filed: Feb. 14, 1994

[51] Int. Cl.[6] .................................................... C08L 95/00
[52] U.S. Cl. ................................................. 524/66; 524/68
[58] Field of Search ........................... 428/291, 489; 524/66, 68, 71

[56] References Cited

U.S. PATENT DOCUMENTS

| | | | |
|---|---|---|---|
| 3,603,221 | 9/1971 | Barton et al. | 404/31 |
| 3,615,802 | 10/1971 | Betty, Jr. et al. | 524/59 |
| 3,644,240 | 2/1972 | Tarbell et al. | 524/66 |
| 3,785,852 | 1/1974 | Schleidt | 524/66 |
| 3,891,585 | 6/1975 | McDonald | 524/59 |
| 3,930,100 | 12/1975 | McDonald | 524/71 |
| 4,032,491 | 6/1977 | Schoenke | 428/489 |
| 4,060,425 | 11/1977 | Harada et al. | 524/66 |
| 4,069,182 | 1/1978 | McDonald | 524/59 |
| 4,080,350 | 3/1978 | Briscoe et al. | 524/66 |
| 4,113,401 | 9/1978 | McDonald | 404/75 |
| 4,137,198 | 1/1979 | Sachs | 521/154 |
| 4,196,115 | 4/1980 | Bresson | 524/68 |
| 4,250,067 | 2/1981 | Bresson | 524/71 |
| 4,386,981 | 6/1983 | Clapperton | 428/291 |
| 4,396,665 | 8/1983 | Rowe | 428/489 |
| 4,436,767 | 3/1984 | Grossi et al. | 525/54.5 |
| 4,442,148 | 4/1984 | Stierli | 428/489 |
| 4,492,781 | 1/1985 | Duszak et al. | 524/59 |
| 4,585,682 | 4/1986 | Colarusso | 428/489 |
| 4,647,606 | 3/1987 | Hahn et al. | 524/62 |
| 4,657,595 | 4/1987 | Russell | 524/59 |
| 4,722,953 | 2/1988 | DeRuiter et al. | 524/44 |
| 4,755,409 | 7/1988 | Harkness | 428/489 |
| 4,775,567 | 10/1988 | Harkness | 428/489 |
| 4,835,199 | 5/1989 | Futamura et al. | 524/66 |
| 4,882,373 | 11/1989 | Moran | 524/68 |
| 4,973,615 | 11/1990 | Futamura et al. | 524/66 |
| 5,019,610 | 5/1991 | Sitz et al. | 524/59 |
| 5,051,457 | 9/1991 | Gelles | 524/68 |
| 5,069,720 | 12/1991 | Epperly et al. | 106/287.35 |
| 5,070,123 | 12/1991 | Moran | 524/59 |
| 5,095,055 | 3/1992 | Moran | 524/59 |
| 5,100,715 | 3/1992 | Zimmerman et al. | 428/291 |
| 5,102,728 | 4/1992 | Gay et al. | 428/489 |
| 5,116,420 | 5/1992 | Schneider et al. | 106/640 |
| 5,130,354 | 7/1992 | Gelles | 524/68 |
| 5,214,082 | 5/1993 | Gelles et al. | 524/68 |

FOREIGN PATENT DOCUMENTS

| | | | |
|---|---|---|---|
| 0378371 | 7/1990 | European Pat. Off. | 428/489 |
| 0378372 | 7/1990 | European Pat. Off. | 428/489 |

*Primary Examiner*—Peter A. Szekely
*Attorney, Agent, or Firm*—Browning, Bushman, Anderson & Brookhart

[57] ABSTRACT

A coal-tar-pitch-based roofing composition containing coal tar pitch, a rubbery block polymer, an extender oil, and an antioxidant to retard degradation of the coal tar pitch during blending of the composition, the composition being formed by heating the coat tar pitch, adding the naphthenic extender oil and the rubbery polymer and agitating the components at an elevated temperature for a period of time until phase inversion between the coal tar pitch and the rubbery polymer occurs.

16 Claims, No Drawings

COAL-TAR-PITCH-BASED COMPOSITIONS

BACKGROUND OF THE INVENTION

1. Field of the Invention

The present invention relates to roofing and sealant compositions. More particularly, the present invention relates to roofing and sealing compositions containing coal tar pitch.

2. Description of the Prior Art

It is known to use coal tar pitch of an appropriate softening point in roofing and other sealant applications. However, the use of coal tar pitch in such applications presents several problems. For one, because of its tendency to flow or cold creep, heretofore coal-tar-pitch-based compositions have not generally been suitable for use on sloped surfaces or as a flashing material. Additionally, because of the fact that coal tar pitch contains carcinogenic materials, it is desirable to minimize heating used in sealant applications such as roofing since high temperatures can result in hazardous volatilization of such carcinogenic materials.

Because of these problems, it would be desirable to have a coal tar pitch composition that could be used in membranes requiring far less heating for application and thus less volatilization of hazardous materials. Such membranes include a reinforcement or substrate such as a polyester cloth, fiberglass cloth, mixed polyester-fiberglass cloths or the like impregnated and/or coated with the coal tar pitch composition. It is also common for the substrate to incorporate a binder that prevents the substrate from stretching in roofing applications.

Additionally, it is desirable to have a coal tar pitch composition for use in roofing and other sealant applications, e.g., roofing membranes, that could be used on sloped surfaces or in flashings and that was not subject to objectionable flow or cold creep.

SUMMARY OF THE INVENTION

It is therefore an object of the present invention to provide an improved coal-tar-pitch- based composition for use in roofing and sealant applications.

Another object of the present invention is to provide a coal tar pitch composition that is resistant to flow or cold creep and can be used in sealant applications on sloped surfaces or as flashing.

Yet a further object of the present invention is to provide a method of forming a coal-tar-pitch-based composition that can be used in roofing and sealant applications, such as membranes.

The present invention will become apparent from the description given herein and in the appended claims.

In one aspect, the present invention provides a coal-tar-pitch-based composition that can be used in roofing and other sealant applications comprising from about 50% to about 70% by weight of a coal tar pitch having a softening point of from about 52° C. to about 64° C., from about 10% to about 17% by weight of a rubbery polymer having from about 50 to about 95 parts by weight conjugated diene and from about 50 to about 5 parts by weight monovinyl aromatics, said rubbery polymer having a block monomer distribution in the form of A-B-A wherein each end block A is a polymer block of a polymerized monovinyl aromatic monomer and the midblock B is a polymer block of polymerized diene. The composition further includes from about 10% to about 15% by weight of an extender oil having an aromatic content such that the composition contains less than about 8% by weight aromatic oil exclusive of any aromatics resulting from the coal tar pitch. An antioxidant, in an amount sufficient to prevent any significant degradation of the coal tar pitch during formation of the composition, is also included in the composition.

According to the method of the present invention, a coal-tar-pitch-based composition for use in roofing and other sealant applications is formed by heating a coal tar pitch having a softening point of from about 52° C. to about 64° C. to a temperature in the range of from about 115° C. to about 125° C. and then adding to the heated coal tar pitch an extender oil that contains less than about 8% by weight aromatics. To the mixture of coal tar pitch and extender oil is added a rubbery polymer as described above. The coal tar pitch, extender oil, and rubbery polymer are agitated at a temperature of from about 125° C. to about 160° C. for a period of time to effect phase inversion between the coal tar pitch and the rubbery polymer. The mixing of the coal tar pitch, extender, and rubbery polymer is conducted under conditions to prevent any significant degradation of the coal tar pitch, i.e., by incorporation of an antioxidant or conducting the mixing in a substantially inert atmosphere, or at least an atmosphere of reduced oxygen content.

DESCRIPTION OF THE PREFERRED EMBODIMENTS

The composition of the present invention contains four primary components: coal tar pitch, a rubbery polymer, an extender oil and an antioxidant.

Coal tax pitch is a dark brown to black amorphous residue left after coal tar is redistilled and is composed almost entirely of polynuclear aromatic compounds that generally constitute 48–65% by weight of the usual grades of coal tar. The coal tar pitch useful in the compositions of the present invention will have a softening point of from about 52° C. to about 64° C. and can be of either Type I or Type III. Typically, Type I coal tar pitches have a softening point of from around 52°–60° C. whereas Type III coal tar pitches have a softening point of from around 56°–64° C. The coal tar pitch will be present in the composition in an amount of from about 50% to about 70% by weight, preferably in an amount of from about 50% to about 65% by weight.

The rubbery polymers useful in the compositions of the present invention are comprised of from about 50 to about 95 parts by weight conjugated diene and from about 50 to about 5 parts by weight monovinyl aromatics. Preferably, the rubbery polymer has a linear configuration. The rubbery polymer will have a block monomer distribution in the form of A-B-A wherein each end block A is a polymer block of a polymerized monovinyl aromatic monomer and the midblock B is a polymer block of polymerized diene. Preferably, each end block A is a polymer block of styrene and derivatives thereof such as ring-alkylated styrene, e.g., vinyl toluene, or alpha-alkylated styrene, e.g., alpha-methyl styrene. The midblock B can be a polymer of any conjugated diene having from 4–8 carbon atoms, the requisite being that the midblock is elastomeric in nature. Generally, the midblock B will be a polymer of 1,3-butadiene. The rubbery polymer will be present in the composition in an amount of from about 10% to about 17% by weight, preferably in an amount of from about 12% to about 16% by weight.

The extender can be virtually any hydrocarbon oil or mixture thereof that is commonly used in rubber compounding or as a plasticizer and processing aid and has an aromatic content such that the aromatic oil content provided by the extender oil does not exceed about 8% by weight in the composition. It will be appreciated that naphthenic and paraffinic oils contain varying aromatic contents, varying widely from as low as about 10% by weight aromatics to as high as about 40% by weight aromatics. As used herein, the aromatic content of the extender oil is as determined by clay-gel analysis, ASTM D-2007. Depending on the type of polymer used, the extender oil can be naphthenic, paraffinic, or a mixture of one or both of the above with a lesser amount of an aromatic oil if desired. It has been found that under certain conditions, an aromatic oil content in the final composition of from about 3% to about 6% produces compositions that are more effectively plasticized. It will be understood that the aromatic oil content referred to herein is that provided by the extender oil and is exclusive of any aromatic content contributed by the coal tar pitch. The extender oil must be compatible with both the coal tar pitch and the rubbery polymer. Specific, non-limiting examples of suitable extender oils include Lyondell Tufflo 4070, a naphthenic oil manufactured by Lyondell Petrochemical Company; Shellflex 371, a naphthenic oil manufactured by Shell Oil Company; and Shellflex 790, a paraffinic oil manufactured by Shell Oil Company. When it is desired to include an aromatic oil, oils such as NUSO-250, marketed by Exxon, can be used. Generally, the extender oils will have flash points of greater than about 300° F. The extender oils will be present in the compositions of the present invention in an amount of from about 10% to about 15% by weight.

The compositions of the present invention will also generally include an antioxidant that is capable of preventing degradation of the coal tar pitch during formation of the composition. It is known that coal tar pitch will degrade at elevated temperatures, i.e., greater than about 125° C. Such degradation is believed to form free radicals or some active species that promotes chain scission of the rubbery polymer, which in turn reduces the softening point of the composition and increases penetration. It has been found that by using an antioxidant/stabilizer, this reaction between the coal tar pitch and the rubbery polymer is minimized. It will be apparent to those skilled in the art that numerous different types of antioxidants/stabilizers commonly used in polymeric compositions can be employed. In particular, a compound such as tetrakis [methylene (3,5-di-tert-butyl-4-hydroxyhydrocinnamate)] methane, marketed as Irgonox B-225 by Ciba-Geigy Corporation, has been found to be a suitable stabilizer/antioxidant. The antioxidant will be present in the compositions of the present invention in an effective amount, i.e., an amount that is sufficient under processing conditions to prevent degradation of the coal tar pitch with resultant chain scission of the rubbery polymer, as described above. In general, the antioxidant will be present in an amount of from about 0.05% to about 1% by weight.

In addition to the above ingredients, the compositions of the present invention may contain additives commonly used in roofing and sealant compositions. Such additives can include fillers, aggregates, pigments, processing aids, modifying resins, fire retardants and adhesions promoters. Thus, the compositions can include fillers such as calcium carbonate in the form of marble; limestone or dolomite; borates, such as calcium borate; etc. It will be appreciated that the compositions of the present invention, depending upon their specific end use, will have various types and amounts of such additives, and accordingly, the selection of any particular type or amount of additive is left to those skilled in the art, depending on the end use of the composition. When such additives are incorporated into the compositions, they will generally be present in an amount of from about 1% to about 25% by weight. It has been found particularly effective to incorporate a flame retardant in an amount sufficient to impart flame retardancy to the composition. Especially preferred as a flame retardant is decabromdiphenyl oxide, incorporated into the composition in an amount of from about 5% to about 12% by weight.

The selection of components of the composition should be such that the final composition has a Brookfield viscosity of from about 3,000 cps to about 15,000 cps at 180° C. and a softening point (R & B) of from about 120° C. to about 130° C. (Ring & Ball, ASTM D-36).

In producing the compositions of the present invention, the coal tar pitch described above is heated to a temperature in the range of from about 115° C. to about 125° C. in a suitable mixer such as a 3-wing anchor agitator or any other type of mixer or agitator well known to those skilled in the art. To the heated coal tar pitch, the extender oil is added, followed by the addition of the rubbery polymer. The mixture is agitated at a suitable rate at a temperature of from about 125° C. to about 160° C. until phase inversion between the coal tar pitch and the rubbery polymer occurs. Typically, this occurs, depending upon the type of mixer and the exact composition, in a period of from about 1 to about 5 hours. It is important in forming suitable compositions according to the present invention that the phase inversion between the coal tar pitch and oil on the one hand, and the polymer on the other hand, be accomplished such that the polymer becomes the continuous phase and the coal tar pitch/oil becomes the discrete phase. Failure to achieve such phase inversion results in products that are more brittle than the original coal tar pitch and/or in which the polymer easily separates from the coal tar pitch after heat aging.

While an antioxidant is typically incorporated into the mixture of the coal tar pitch, the extender oil, and the rubbery polymer before or at the time the coal tar pitch is heated, but in any event prior to admixing with the rubbery polymer, it is also possible, it is believed, to prevent degradation of the coal tar pitch by conducting the phase inversion mixing of the coal tar pitch, the oil, and the rubbery polymer in a substantially inert atmosphere. Since on a large-scale commercial operation this presents logistical problems, the addition of an antioxidant is preferable to the exclusion of air as a method of controlling the coal tar pitch degradation.

To more fully illustrate the present invention, the following non-limiting examples are presented.

In all of the examples that follow, the coal tar pitch employed was a Type I coal tar pitch having a softening point of from about 52° C. to about 60° C. The rubbery polymer employed in all of the examples that follow was a styrene/butadiene block copolymer (SBS polymer) that had a linear molecular structure, contained 30% by weight styrene and 70% by weight butadiene. In the example, all percentages are weight percent values unless otherwise indicated.

Example 1

A series of coal-tar-pitch-based blends were prepared as follows: The specified quantity of coal tar pitch was measured into the blend vessel and heated to 120° C. The extender oil was added, followed by immediate addition of the SBS polymer and the antioxidant. The mixture was then agitated using a 2-wing anchor agitator at 50–100 rpm and heated to 150° C. for 2.5 hours, unless otherwise indicated, care being taken to ensure that phase inversion between the coal tar pitch and the SBS polymer had occurred. Determination of phase inversion was accomplished using fluorescent microscopy. Table 1 shows the make-up of the compositions while Table 2 shows the physical properties of the compositions.

TABLE 1

| Sample | A | B | C Wt. % | D | E |
|---|---|---|---|---|---|
| Coal Tar Pitch | 59.5 | 60.0 | 59.5 | 60.7 | 60.0 |
| TF-4070[1] | 15.0 | 15.0 | 0.0 | 10.8 | 15.0 |
| SF-790[2] | 0.0 | 0.0 | 15.0 | 0.0 | 0.0 |
| T-6302[3] | 15.0 | 15.0 | 15.0 | 13.0 | 15.0 |
| B-225[4] | 0.5 | 0.0 | 0.5 | 0.5 | 0.0 |
| $CaCO_3$ | 10.0 | 10.0 | 10.0 | 0.0 | 10.0 |
| Decabromodiphenyl Oxide | 0.0 | 0.0 | 0.0 | 9.4 | 0.0 |
| Calcium Borate | 0.0 | 0.0 | 0.0 | 5.6 | 0.0 |
| TOTAL | 100.0 | 100.0 | 100.0 | 100.0 | 100.0 |

[1]Naphthenic oil marketed as Tufflo 4070 by Lyondell Petrochemical Co. and containing 22% by weight aromatics.
[2]Paraffinic oil marketed as Shellflex 790 by Shell Oil Company and containing 29% by weight aromatics.
[3]SBS block polymer containing 30% by weight styrene and 70% by weight butadiene having an average MW of 110,000.
[4]Tetrakis [methylene (3,5-di-tert-butyl-4-hydroxyhydrocinnamate)] methane, marketed as Irgonox B-225 by Ciba-Geigy Corporation.

TABLE 2

| Sample | A | B | C | D | E |
|---|---|---|---|---|---|
| Vis. (cps) @ 180° C. | 7,173 | 10,685 | 22,050 | 3,141 (5462)[2] | 10,135 |
| R & B (°C.) | 131.5 | 131.0 | 141.3 | 118.75 (124.8)[2] | 133.75 |
| Pen.[1] (dmm) | 23.7 | 22.3 | 23.0 | 19.00 (20.40)[2] | 20.40 |

[1]At 25° C. (ASTM D-5).
[2]() indicates blending for 4 hours.

As can be seen from the data in Tables 1 and 2, the use of naphthenic oils with SBS polymers of that particular type produces coal tar pitch compositions having the desired physical properties. As can also be seen, the use of paraffinic oils with the same polymer produces a composition that has an unacceptably high viscosity and softening point. This points to the fact that the selection of the polymer will dictate the nature of the extender oil used. Note also, by comparing the results as to Samples A and B, that compositions without an antioxidant display increased viscosity and a drop in penetration. With respect to Sample D, it can be seen that more thorough mixing slightly increases viscosity but brings the softening point from a slightly low to a highly acceptable value.

Example 2

The procedure of Example 1 was followed, except that Sample E below was mixed for 4 hours rather than 2.5 hours. The compositions and physical properties are shown in Tables 3 and 4 below, respectively.

TABLE 3

| Sample | A | B | C Wt. % | D | E |
|---|---|---|---|---|---|
| Coal Tar Pitch | 57.0 | 60.5 | 61.0 | 57.0 | 54.5 |
| TF-4070 | 12.5 | 10.5 | 10.5 | 12.5 | 15.0 |
| T-6302 | 15.0 | 13.5 | 13.0 | 15.0 | 15.0 |
| B-225 | 0.5 | 0.5 | 0.5 | 0.5 | 0.5 |
| Decabromodiphenyl Oxide | 9.4 | 9.4 | 9.4 | 9.4 | 9.4 |
| Calcium Borate | 5.6 | 5.6 | 5.6 | 5.6 | 5.6 |
| TOTAL | 100.0 | 100.0 | 100.0 | 100.0 | 100.0 |

TABLE 4

| Sample | A | B | C | D | E |
|---|---|---|---|---|---|
| Vis. (cps) @ 180° C. | 4,050 | 3,133 | 5,658.7 | 10,366 | 7,316 |
| R & B (°C.) | 122.5 | 114.75 | 130.5 | 126.7 | 122.2 |
| Pen. (dmm) | 24.0 | 22.25 | 20.3 | 27.0 | 25.3 |

Example 3

The procedure of Example 1 was followed with the exception that all compositions contained 10% by weight calcium carbonate, 15% T-6302 rubbery polymer, varying amounts of naphthenic oil and the balance coal tar pitch. The samples were blended for 4 hours. The physical property measurements of varying levels for naphthenic oil are shown in Table 5.

TABLE 5

| SF-OIL[1] | | |
|---|---|---|
| 15% | Vis. (cps) | 7,800 |
| | R & B (°C.) | 122.5 |
| | Pen. (dmm) | 20.8 |
| 12.5% | Vis. (cps) | 9,125 |
| | R & B (°C.) | 125.75 |
| | Pen. (dmm) | 18.8 |
| 10% | Vis. (cps) | 14,700 |
| | R & B (°C.) | 125 |
| | Pen. (dmm) | 18.6 |

[1]Naphthenic oil marketed as Shellflex 371 by Shell Oil Company and containing 10% by weight aromatics.

As can be seen from the data in Table 5, the compositions produced have the required physical properties over a range of extender oil concentrations.

Example 4

The procedure of Example 3 was followed, with the exception that the extender oil concentration in all cases was 12.5%. In all cases, the balance of the composition was coal tar pitch. The physical property measurements for varying polymer levels are shown in Table 6 below.

TABLE 6

| T-6032 | | |
|---|---|---|
| 15% | Vis. (cps) | 9,125 |
| | R & B (°C.) | 125.75 |
| | Pen. (dmm) | 18.8 |
| 12.5% | Vis. (cps) | 2666.7 |
| | R & B (°C.) | 120.6 |
| | Pen. (dmm) | 26.2 |
| 10% | Vis. (cps) | 1,675 |
| | R & B (°C.) | 94 |
| | Pen. (dmm) | 30+ |

As can be seen from the data in Table 6, at about 10% by weight level of rubbery polymer, the compositions have unacceptably low viscosity and softening points. Note that at a polymer level of 12.5%, the softening point and viscosity are well within the acceptable ranges.

Example 5

This example demonstrates the use of an extender oil comprising a paraffinic or naphthenic oil in admixture with an aromatic oil. The samples were prepared as per the procedure of Example 1, except all samples were mixed for 4 hours. The compositions and physical properties of the blends are shown in Tables 7 and 8 below, respectively.

TABLE 7

| Sample | A | B | C | D | E |
|---|---|---|---|---|---|
| | | | Wt. % | | |
| Coal Tar Pitch | 61.5 | 61.5 | 61.5 | 61.5 | 61.5 |
| T-6302 | 15.0 | 15.0 | 15.0 | 15.0 | 15.0 |
| TF-4070 | | | | 13.0 | 9.75 |
| SF-790 | 6.5 | 3.25 | 9.75 | | |
| NUSO-250[1] | 6.5 | 9.75 | 3.25 | | 3.25 |
| B-225 (Ciba-Geigy) | 0.5 | 0.5 | 0.5 | 0.5 | 0.5 |
| Decabromo-diphenyl Oxide | 6.25 | 6.25 | 6.25 | 6.25 | 6.25 |
| Calcium Bocate | 3.75 | 3.75 | 3.75 | 3.75 | 3.75 |
| TOTAL | 100.0 | 100.0 | 100.0 | 100.0 | 100.0 |

[1]Aromatic oil marketed by Exxon and containing 66% by weight aromatics.

TABLE 8

| Sample | A | B | C | D | E |
|---|---|---|---|---|---|
| Vis. (cps) @ 180° C. | 8,696.0 | 6,450 | 15,300 | 9,254 | 5,346 |
| R & B (°C.) | 121.5 | 119.0 | 1,320 | 126 | 124 |
| Pen. (dmm) | 19.0 | 24.0 | 20.0 | 30 | 20 |

As can be seen from the data in Tables 7 and 8, mixtures of paraffinic or naphthenic oils with aromatic oil produce blends having acceptable viscosity and softening points. Indeed, it has been found that with an aromatic content in the final composition of from about 3% to about 6% by weight, the compositions are more effectively plasticized. When the aromatic content in the final composition exceeds about 8% by weight, the softening point falls to unacceptably low levels, making the end products unfit for roofing membranes.

In all cases, the compositions produced above exhibit excellent resistance to cold flow or creep, making them suitable for use in roofing applications on sloped roofs, or as flashings.

It will be understood that the compositions of the present invention can be incorporated into roofing membranes utilizing substrates as described above to produce roofing composites having a wide application on sloped roofs, or as flashings. It will also be apparent to those of skill in the art that the compositions of the present invention can be used in other sealant applications.

The foregoing description and examples illustrate selected embodiments of the present invention. In light thereof, variations and modifications will be suggested to one skilled in the art, all of which are in the spirit and purview of this invention.

What is claimed is:

1. A coal-tar-pitch-based composition suitable for use in roofing and other sealant applications comprising:

from about 50% to about 70% by weight of a coal tar pitch having a softening point of from about 52° C. to about 64° C.;

from about 10% to about 17% by weight of a rubbery polymer having from about 50 to about 95 parts by weight conjugated diene and about 50 to about 5 parts by weight monovinyl aromatics, said rubbery polymer having a block monomer distribution in the form of A-B-A wherein each end block A is a polymer block of a polymerized monovinyl aromatic monomer and the midblock B is a polymer block of polymerized diene;

from about 10% to about 15% by weight of an extender oil, the extender oil having a compositional makeup such that the aromatic oil content of the composition exclusive of the coal tar pitch is less than about 8% by weight; and an antioxidant in an amount of from about 0.05% to about 1.0% by weight.

2. The composition of claim 1 wherein said coal tar pitch is present in an amount of from about 50% to about 65% by weight.

3. The composition of claim 1 wherein said rubbery polymer is present in an amount of from about 13% to about 16% by weight.

4. The composition of claim 1 further containing additives selected from the class consisting of fillers, aggregates, pigments, processing aids, modifying resins, fire retardants, and adhesion promoters.

5. The composition of claim 1 wherein said block A is a polymer block of polymerized styrene.

6. The composition of claim 1 wherein said block B is a polymer block of polymerized 1,3-butadiene.

7. The composition of claim 1 including an effective amount of decabromodiphenyl oxide to act as a flame retardant.

8. The composition of claim 1 having a Brookfield viscosity of from about 3,000 cps to about 15,000 cps at 180° C. and a softening point of from about 120° C. to about 130° C.

9. A method of producing a coal-tar-pitch-based composition for use in roofing and other sealant applications comprising:

a. heating a coal tar pitch having a softening point of from about 52° C. to about 64° C. to a temperature in the range of from about 115° C. to about 125° C.;

b. adding to said heated coal tar pitch an extender oil, the extender oil having a compositional makeup such that the aromatic oil content of the composition exclusive of the coal tar pitch is less than about 8% by weight;

c. adding to the mixture of coal tar pitch and extender oil a rubbery polymer having from about 50 to about 95 parts by weight conjugated diene and about 50 to about 5 parts by weight monovinyl aromatics, said rubbery polymer having a block monomer distribution in the form of A-B-A wherein each end block A is a polymer block of a polymerized monovinyl aromatic monomer and the midblock B is a polymer block of polymerized diene;

d. agitating the mixture of coal tar pitch, extender oil, and rubbery polymer at a temperature of from about 125° C. to about 160° C. and for a period of time until phase inversion between said coal tar pitch and said rubbery polymer occurs; and wherein Step d is conducted in the presence of from about 0.05% to about 1.0 by weight of an antioxidant.

10. The method of claim 9 wherein said coal tar pitch is present in an amount of from about 50% to about 70% by weight.

11. The method of claim 9 wherein said rubbery polymer is present in an amount of from about 10% to about 17% by weight.

12. The method of claim 9 further comprising adding additives selected from the class consisting of fillers, aggregates, pigments, processing aids, modifying resins, fire retardants, and adhesion promoters.

13. The method of claim 9 wherein said block A is a polymer block of polymerized styrene.

14. The method of claim 9 wherein said block B is a polymer block of 1,3-butadiene.

15. The method of claim 9 wherein said rubbery polymer contains from about 30 to about 45 parts by weight monovinyl aromatic and from about 55 to about 70 parts by weight conjugated diene.

16. The method of claim 9 including adding an effective amount of decabromodiphenyl oxide to act as a flame retardant.

* * * * *